US007362207B2

(12) United States Patent
Malingowski et al.

(10) Patent No.: US 7,362,207 B2
(45) Date of Patent: Apr. 22, 2008

(54) ELECTRICAL SWITCHING APPARATUS AND LIMITER INCLUDING TRIP INDICATOR MEMBER

(75) Inventors: Richard P. Malingowski, Finleyville, PA (US); Ramon J. Ojeda, Imperial, PA (US); Mark A. Janusek, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 378 days.

(21) Appl. No.: 11/136,135

(22) Filed: May 24, 2005

(65) Prior Publication Data

US 2006/0267720 A1 Nov. 30, 2006

(51) Int. Cl.
*H01H 85/30* (2006.01)
*G01D 5/02* (2006.01)

(52) U.S. Cl. ...................... 337/206; 337/265; 337/267; 116/281

(58) Field of Classification Search ................ 337/206, 337/265, 267; 116/281
See application file for complete search history.

(56) References Cited

U.S. PATENT DOCUMENTS

| | | | | | |
|---|---|---|---|---|---|
| 2,526,448 | A | | 10/1950 | Amundson et al. | |
| 3,242,291 | A | | 3/1966 | Frink | |
| 3,582,586 | A | | 6/1971 | Jones | |
| 3,593,251 | A | * | 7/1971 | Wilson | 337/186 |
| 3,621,433 | A | * | 11/1971 | Belcher | 337/244 |
| 3,638,157 | A | * | 1/1972 | Kruzic | 337/6 |
| 3,657,679 | A | * | 4/1972 | Wilson | 337/244 |
| 3,678,430 | A | * | 7/1972 | Gaia | 337/159 |
| 3,713,064 | A | * | 1/1973 | Jacobs, Jr. | 337/161 |
| 3,721,936 | A | * | 3/1973 | Belcher | 337/241 |
| 3,761,660 | A | | 9/1973 | Jones | |
| 3,766,507 | A | * | 10/1973 | Jacobs, Jr. | 337/161 |
| 3,783,428 | A | * | 1/1974 | Swain et al. | 337/148 |
| 3,818,406 | A | * | 6/1974 | Klein | 337/148 |
| 3,832,665 | A | * | 8/1974 | Belcher | 337/244 |
| 3,895,338 | A | * | 7/1975 | Gray et al. | 337/244 |
| 3,925,745 | A | | 12/1975 | Blewitt | |
| 4,008,452 | A | | 2/1977 | Cameron | |
| 4,023,133 | A | * | 5/1977 | Knapp, Jr. | 337/206 |
| 4,035,755 | A | | 7/1977 | Cameron | |
| 4,058,784 | A | * | 11/1977 | Gaia | 337/164 |
| 4,085,396 | A | * | 4/1978 | Augis et al. | 337/290 |
| 4,099,153 | A | | 7/1978 | Cameron | |
| 4,166,266 | A | | 8/1979 | Kozacka et al. | |
| 4,167,723 | A | | 9/1979 | Wilks | |
| 4,179,677 | A | | 12/1979 | Kozacka et al. | |
| 4,204,182 | A | * | 5/1980 | Knapp, Jr. | 337/244 |

(Continued)

*Primary Examiner*—Anatoly Vortman
(74) *Attorney, Agent, or Firm*—Martin J. Moran

(57) ABSTRACT

A limiter includes a housing having a first surface and a second surface, a line terminal, a load terminal, a fusible conductor electrically connected between the line and load terminals and an indicator button disposed proximate the first surface. The button includes a first end and a second end having a first opening, a second opening and a conduit therein between the first and second openings. The fusible conductor passes from the first terminal, through the first opening, through the conduit, through the second opening, and to the load terminal. A spring biases the button away from the first surface. The fusible conductor, when electrically connected between the line and load terminals, holds the second end proximate the first surface. The spring, when the fusible conductor is electrically disconnected from one or both of the terminals, moves the button away from the first surface and toward the second surface.

5 Claims, 6 Drawing Sheets

U.S. PATENT DOCUMENTS 4,251,699 A 2/1981 Wiltgen, Jr.
4,307,368 A 12/1981 Reid
4,309,684 A 1/1982 Wilks
4,319,212 A 3/1982 Leach
4,323,872 A * 4/1982 Fontaine ..................... 337/158
4,323,874 A * 4/1982 Link .......................... 337/244
4,339,742 A 7/1982 Leach et al.
4,340,790 A 7/1982 Boliver
4,384,266 A * 5/1983 Lo ............................. 337/244
4,387,358 A * 6/1983 Knapp, Jr. .................. 337/244
4,444,671 A 4/1984 Wiltgen, Jr.
4,511,876 A * 4/1985 Urani ......................... 337/244
4,520,337 A 5/1985 Cameron
4,598,332 A 7/1986 Kemeny
4,599,671 A 7/1986 Kemeny et al.
4,625,195 A 11/1986 Robbins
4,638,283 A 1/1987 Frind et al.
4,766,408 A * 8/1988 Cameron et al. ........... 337/244
4,778,958 A 10/1988 Mayer et al.
4,808,963 A 2/1989 Stunzi et al.
4,906,962 A * 3/1990 Duimstra .................... 337/239
4,950,852 A 8/1990 Goldman et al.
4,952,900 A 8/1990 Cameron et al.
4,975,551 A 12/1990 Syvertson
4,995,886 A 2/1991 Cameron et al.
5,471,185 A 11/1995 Shea et al.
5,793,278 A 8/1998 Pohl et al.
5,886,613 A * 3/1999 Magoon et al. ............. 337/244

* cited by examiner

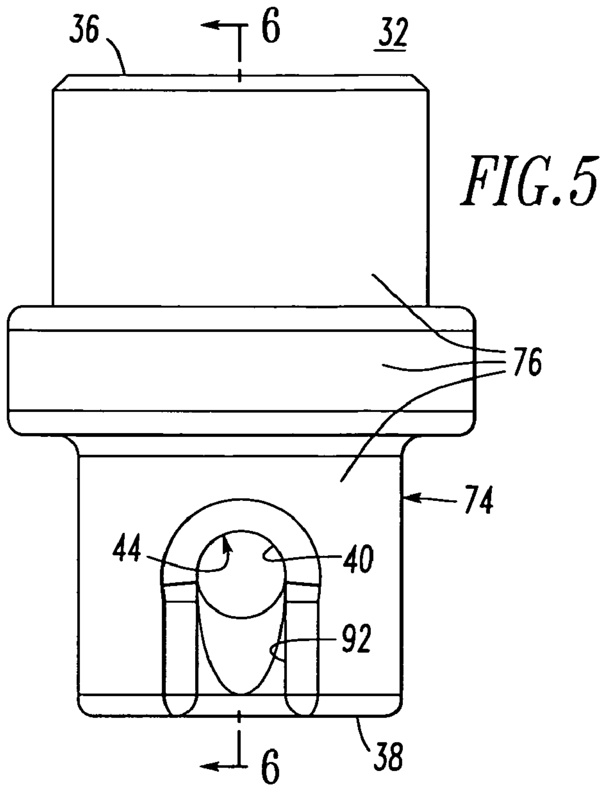
FIG.5
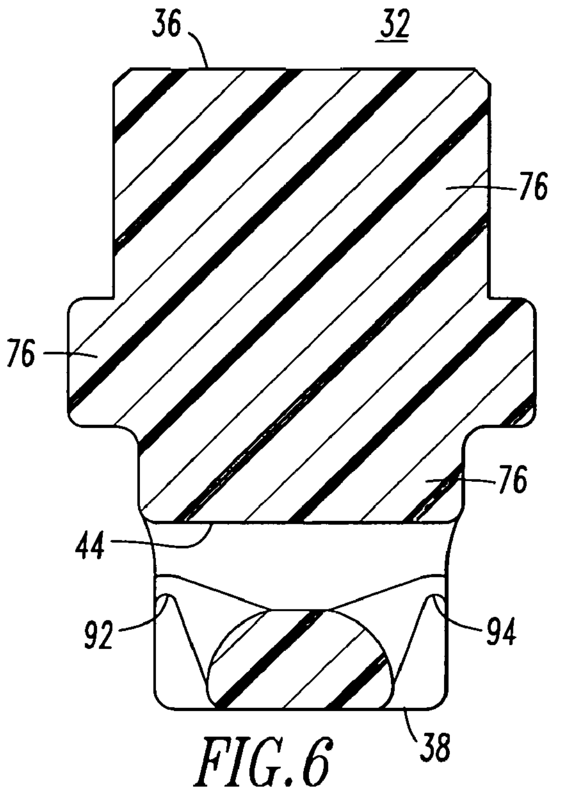
FIG.6
FIG.7
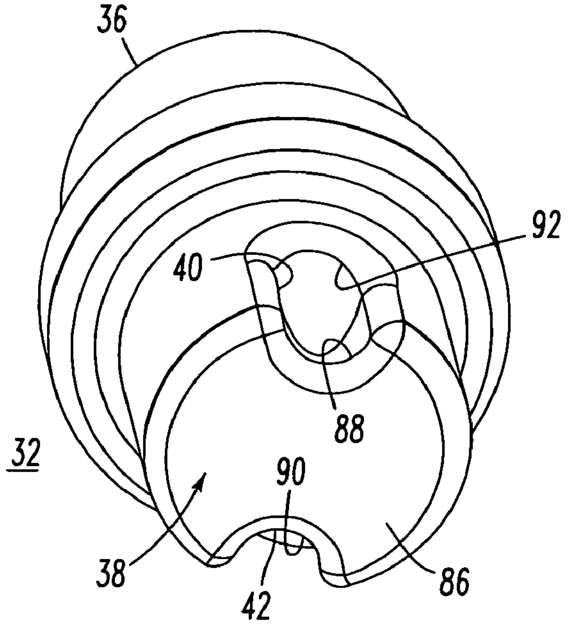

ELECTRICAL SWITCHING APPARATUS AND LIMITER INCLUDING TRIP INDICATOR MEMBER

BACKGROUND OF THE INVENTION

1. Field of the Invention

This invention pertains generally to electrical switching apparatus and, more particularly, to circuit breakers including a limiter having a trip indicator member. The invention also relates to limiters and to trip indicators therefore.

2. Background Information

Current limiting power interruption requires a current interruption device that rapidly and effectively brings the current to a relatively low or zero value upon the occurrence of a line fault or overload condition.

Circuit protection devices protect electrical equipment from damage when excess current flows in the circuit due to overload or short circuit conditions. Such devices have a relatively low resistivity and, accordingly, high conductivity under normal current conditions of the circuit, but are "tripped" or converted to high or complete resistivity when excessive current and/or temperature occurs. When the device is tripped, a reduced or zero current is allowed to pass in the circuit, thereby protecting the wires and load from electrical and thermal damage until the overload or fault is removed.

Conventional circuit protection or current limiting devices include, but are not limited to, circuit breakers, fuses (e.g., expulsion fuses), thermistors (e.g., PTC (Positive Temperature Coefficient) conductive polymer thermistors), and the like. These devices are current rated for the maximum current the device can carry without interruption under a load.

Circuit breakers typically contain a load sensing element (e.g., a bimetal, hot-wire or magnetic element) and a switch which opens under overload or short circuit conditions. Most circuit breakers have to be reset manually at the breaker site or via a remote switch.

Fuses typically contain a load sensing fusible element (e.g., metal wire), which when exposed to current of fault magnitude rapidly melts and vaporizes through resistive heating ($I^2R$). Formation of an arc in the fuse, in series with the load, can introduce arc resistance into the circuit to reduce the peak let-through current to a value significantly lower than the fault current. Expulsion fuses may further contain gas-evolving or arc-quenching materials which rapidly quench the arc upon fusing to eliminate current conduction. Fuses generally are not reusable and must be replaced after overload or short circuit conditions because they are damaged inherently, when the circuit opens.

Various fusible elements, gas-evolving materials and fuses are shown for example in U.S. Pat. Nos. 2,526,448; 3,242,291; 3,582,586; 3,761,660; 3,925,745; 4,008,452; 4,035,755; 4,099,153; 4,166,266; 4,167,723; 4,179,677; 4,251,699; 4,307,368; 4,309,684; 4,319,212; 4,339,742; 4,340,790; 4,444,671; 4,520,337; 4,625,195; 4,638,283; 4,778,958; 4,808,963; 4,950,852; 4,952,900; 4,975,551; 4,995,886; and 5,471,185.

Low-voltage circuit-breakers are often connected in series with so-called limiters, in order to significantly increase the short-circuit switching capacity in low-voltage electrical networks and to significantly limit the cut-off currents. Such limiters are designed to transition rapidly, in case of a short circuit, from a low-resistance state to a high-resistance state and contribute with their voltage requirement to rapid current limiting and disconnection. Some limiters employ, for example, fuses, such as fusible wire elements to accomplish this function.

It is known to provide a trip indication for a circuit breaker limiter through a button visible at the top surface thereof. The button changes position responsive to a spring when the button is released by a fused wire element. For example, the button "pops" above the surface of the limiter when the fused wire element burns opens during a fault.

As shown in FIG. 1, a molded button 2 includes a central opening 4 having a separate molded part 6 therein. The separate molded part 6 cooperates with a fused wire element 8 to retain the wire element 8 and to hold the button 2 in place against the bias of spring 10. The fused wire element 8 passes through an assembly frame 12 and gaskets 13 of a limiter 14 and is electrically connected in series between a circuit breaker load terminal (not shown) and a load (not shown). The central opening 4 in the molded button 2 permits the assembly of the wire element 8 and the separate molded part 6 outside of the top (with respect to FIG. 1) of the button 2. The bias spring 10 pushes the button 2 up when the wire element 8 burns open.

There is room for improvement in electrical switching apparatus and in limiters for such apparatus. There is also room for improvement in indicators for limiters.

SUMMARY OF THE INVENTION

These needs and others are met by the present invention, which provides an improved trip indicator for a limiter including an indicator member, such as an indicator button, and a fusible electrical conductor, such as a fusible conductor.

In accordance with one aspect of the invention, an indicator member for a limiter comprises: a body including a first end, an insulating generally cylindrical body portion and a second end having a first opening, a second opening and a conduit therein between the first opening and the second opening, the first opening, the second opening and the conduit being adapted to receive a fusible electrical conductor passing through the first opening, through the conduit and through the second opening, the first end being electrically insulated from and physically separated from the second end by the insulating generally cylindrical body portion.

The insulating generally cylindrical body portion may be a first solid insulating body portion, and the first end may be a second solid insulating body portion.

As another aspect of the invention, a limiter comprises: a housing including a first surface and a second surface; a first terminal; a second terminal; a fusible conductor electrically connected between the first terminal and the second terminal; an indicator member disposed proximate the first surface of the housing, the indicator member including a first end and a second end having a first opening, a second opening and a conduit therein between the first opening and the second opening thereof, the fusible conductor passing from the first terminal, through the first opening of the indicator member, through the conduit of the indicator member, through the second opening of the indicator member, and to the second terminal; and a spring biasing the indicator member away from the first surface of the housing, the fusible conductor, when electrically connected between the first terminal and the second terminal, holds the second end of the indicator member proximate the first surface of the housing, and the spring, when the fusible conductor is electrically disconnected from at least one of the first terminal and the second terminal, moves the indicator member away from the first surface of the housing and toward the second surface of the housing.

The indicator member may further include a body having the first end, a solid insulating body portion and the second end, the second end being a substantially solid end having the first opening, the second opening and the conduit therein between the first opening and the second opening; and the first end may be electrically insulated from and physically separated from the substantially solid end by the solid insulating body portion, thereby prohibiting user access to the fusible conductor.

The solid insulating body portion may be a first solid insulating body portion, and the first end may be a second solid insulating body portion.

The indicator member may include a generally cylindrical body, and the first and second openings may be disposed proximate the second end of the indicator member and pass through the generally cylindrical body.

As another aspect of the invention, an electrical switching apparatus comprises: a circuit interrupter comprising: a housing, a first terminal, a second terminal, separable contacts electrically connected between the first terminal and the second terminal, and an operating mechanism structured to open and close the separable contacts; and a limiter comprising: a housing including a surface, a third terminal electrically connected to the second terminal of the circuit interrupter, a fourth terminal, a fusible conductor electrically connected between the third terminal and the fourth terminal, an indicator member disposed proximate the surface of the housing of the limiter, the indicator member including a first end and a second end having a first opening, a second opening and a conduit therein between the first opening and the second opening thereof, the fusible conductor passing from the third terminal, through the first opening of the indicator member, through the conduit of the indicator member, through the second opening of the indicator member, and to the fourth terminal, and a spring biasing the indicator member away from the surface of the housing of the limiter, the fusible conductor, when electrically connected between the third terminal and the fourth terminal, holds the second end of the indicator member proximate the surface of the housing of the limiter, and the spring, when the fusible conductor is electrically disconnected from at least one of the third terminal and the fourth terminal, moves the indicator member away from the surface of the housing of the limiter.

The indicator member may include a generally cylindrical body, and the first and second openings may be disposed proximate the second end of the indicator member and pass through the generally cylindrical body. The second end may include a generally flat surface, and the first and second openings may be generally defined by first and second U-shaped openings, respectively, in the generally flat surface and by third and fourth opposing U-shaped openings, respectively, in the generally cylindrical body. The surface of the housing of the limiter may have an opening therein, and the fusible conductor may pass from the third terminal, through the opening of the surface of the housing of the limiter, through the first U-shaped opening, through the third U-shaped opening, through the conduit, through the fourth U-shaped opening, through the second U-shaped opening, through the opening of the surface of the housing of the limiter, and to the fourth terminal.

BRIEF DESCRIPTION OF THE DRAWINGS

A full understanding of the invention can be gained from the following description of the preferred embodiments when read in conjunction with the accompanying drawings in which:

FIG. 5 is a vertical elevation view of the indicator button of FIG. 2.

FIG. 6 is a cross section view of the indicator button along lines 6-6 of FIG. 5.

FIG. 7 is a bottom isometric view of the indicator button of FIG. 2.

DESCRIPTION OF THE PREFERRED EMBODIMENTS

The present invention is described in association with a limiter for a three-pole circuit breaker including three trip indicator members, although the invention is applicable to a wide range of limiters for circuit interrupters having one or more poles and to an indicator member for a limiter having one or more poles.

Figure 2:
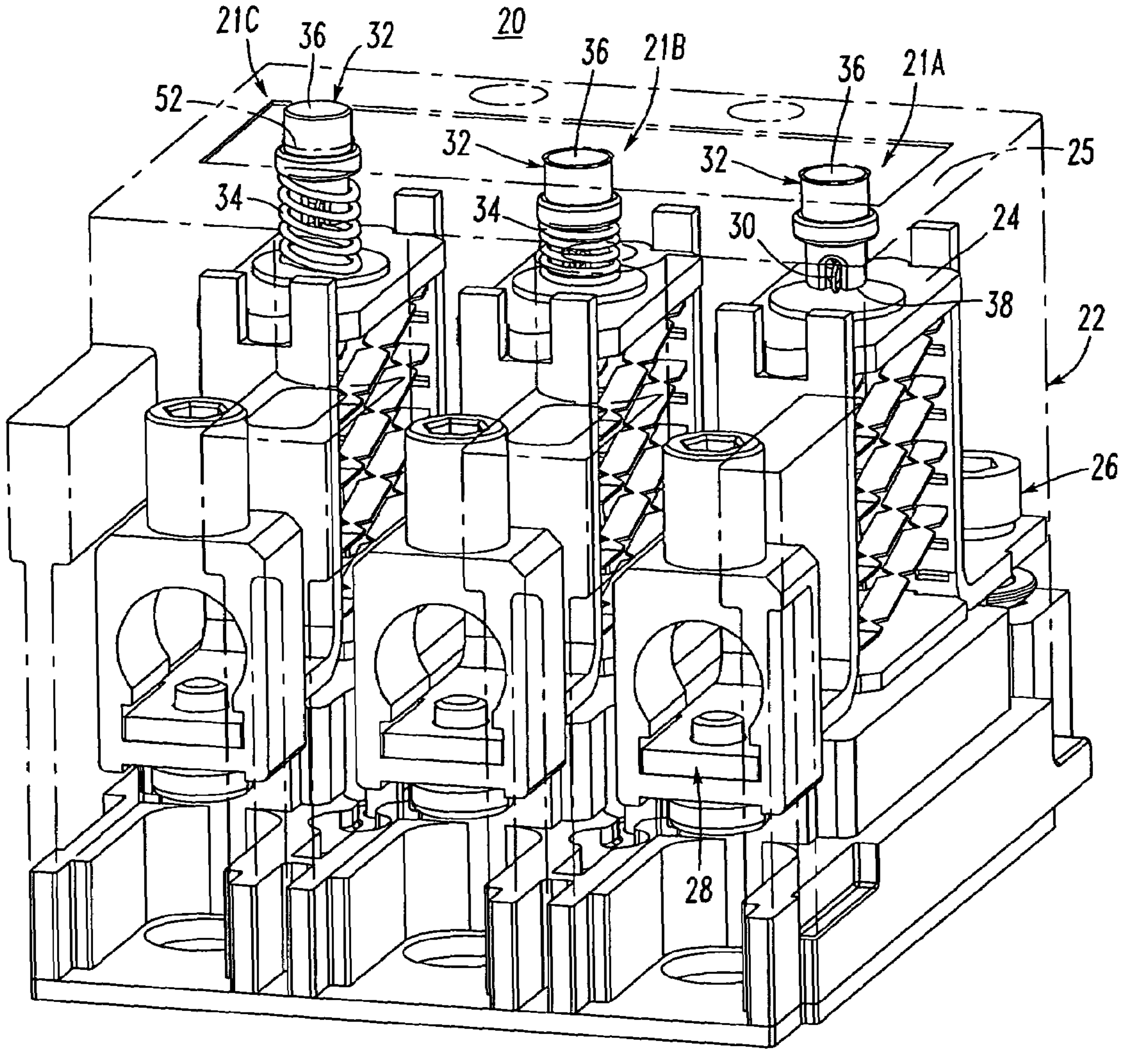
FIG. 2 is an isometric view of a circuit breaker limiter in accordance with the present invention.
Figure 4:
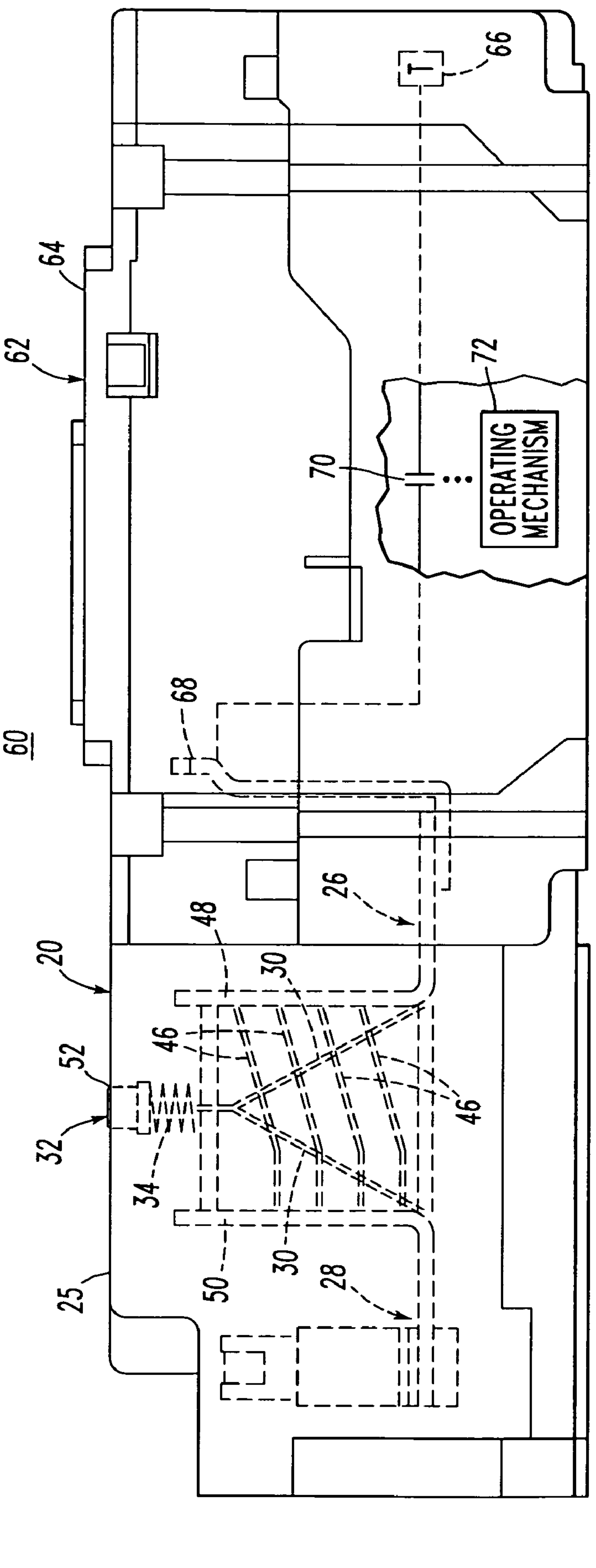
FIG. 4 is a vertical elevation section view of a circuit breaker and a circuit breaker limiter in accordance with another embodiment of the invention.

Referring to FIG. 2, a three-pole circuit breaker limiter 20 includes three poles 21A,21B,21C and a housing 22 (part of which is shown in phantom line drawing) having a first (inner) surface 24 and a second (outer) surface 25. Each of the three poles (as shown with pole 21A) includes a first terminal 26, a second terminal 28, a fusible conductor 30 electrically connected between (as best shown in FIG. 4) the first terminal 26 and the second terminal 28, an indicator member, such as indicator button 32, and a spring 34 (as shown with poles 21B,21C). The indicator member 32 is disposed proximate the housing surface 24.

Figure 8:
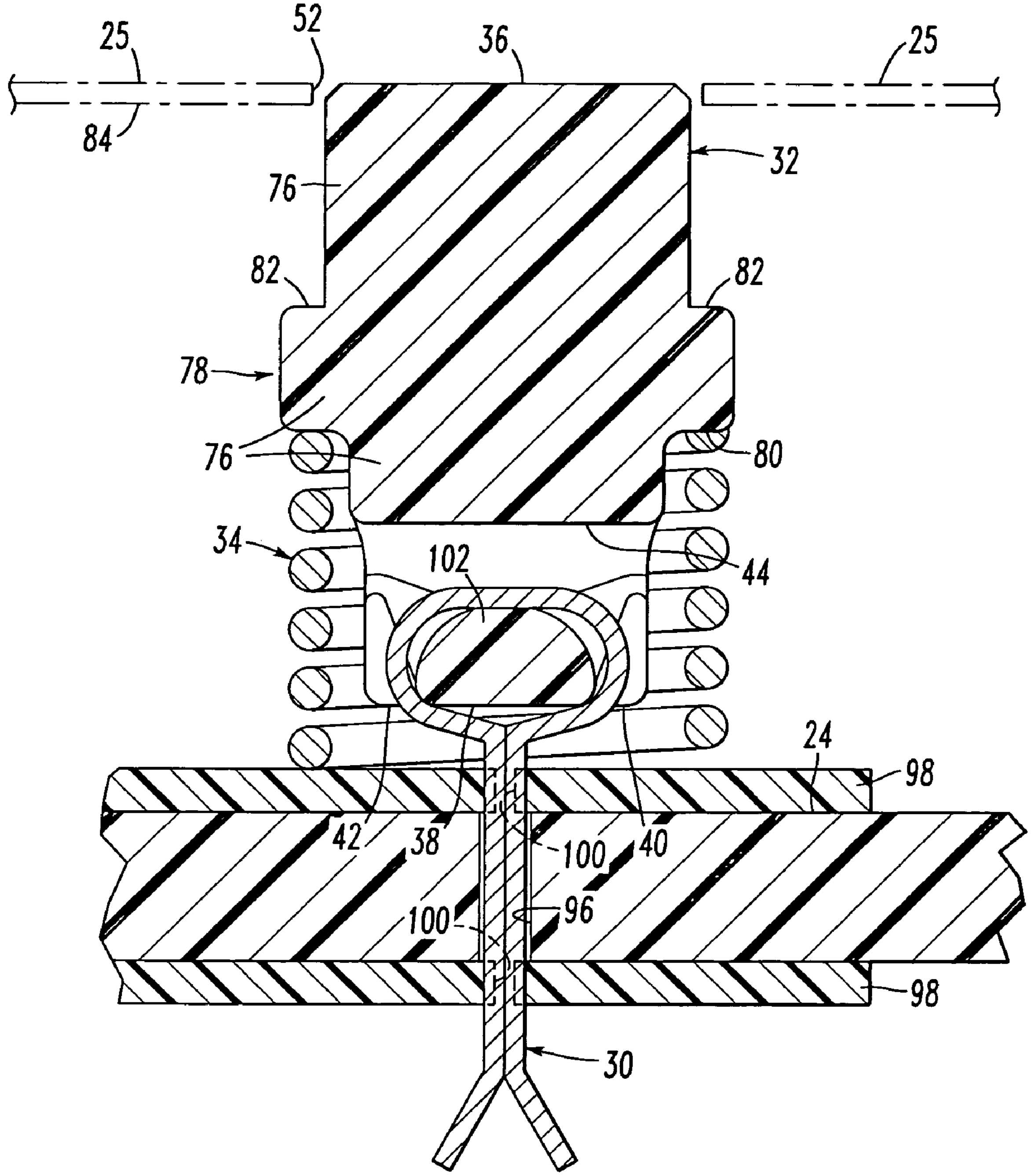
FIG. 8 is a vertical elevation section view of the indicator button, fusible wire element and spring of the circuit breaker limiter of FIG. 2.

Also referring to FIG. 8, the indicator member 32 includes a first end 36 and an opposite second end 38 having a first opening 40, a second opening 42 and a conduit 44 therein between the first opening 40 and the second opening 42. The fusible conductor 30 passes from the first terminal 26 (FIG. 2), through the first opening 40 of the indicator member 32, through the conduit 44 of the indicator member, through the second opening 42 of the indicator member, and to the second terminal 28 (FIG. 2).

The spring 34 biases the indicator member 32 away from the surface 24 of the housing 22. The fusible conductor 30, when electrically connected between the first and the second terminals 26,28, holds the second end 38 of the indicator member 32 proximate the housing surface 24. The spring 34, when the fusible conductor 30 is electrically disconnected from at least one of the first and second terminals 26,28, moves the indicator member 32 away from the first housing surface 24 and toward the second housing surface 25 (shown in phantom line drawing).

Figure 3:
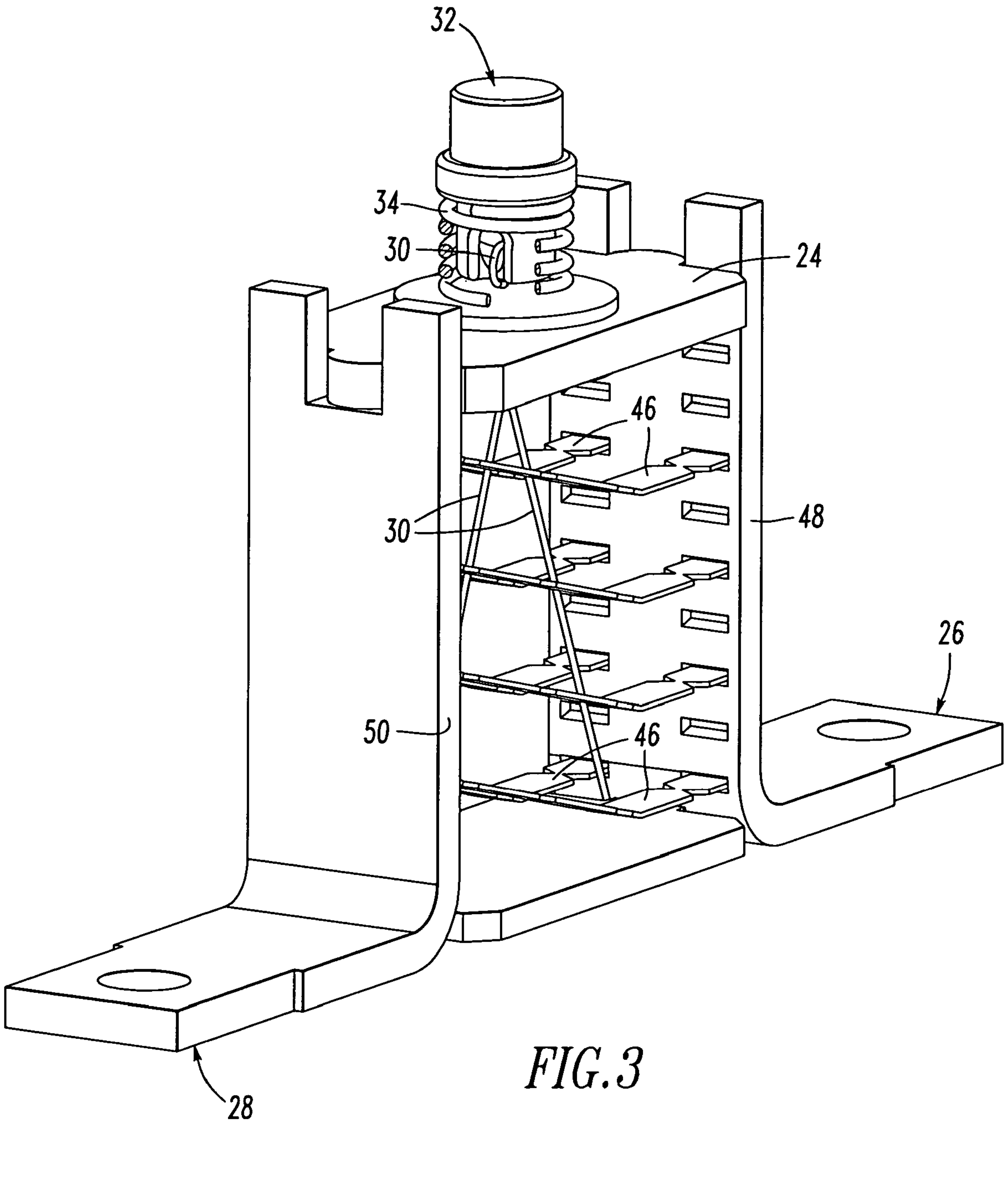
FIG. 3 is an isometric view of the indicator button, fusible wire element, spring and other fusible elements of FIG. 2.

Although not required, as shown in FIG. 3, a plurality of fusible elements, such as fuse members 46, are electrically connected between a first L-shaped member 48 of the first terminal 26 and a second L-shaped member 50 of the second terminal 28. As an example, four pairs of parallel fuse members 46 are electrically connected between the first and second terminals 26,28. Normally, rated current is carried by the parallel fuse members 46. Whenever the fuse members

46 burn open, the fusible conductor 30 rapidly burns open and releases the indicator member 32.

Referring again to FIG. 2, the second end 38 of the indicator member 32 is inside of the housing 22 as best shown with the pole 21A. As shown with the pole 21C, the second surface 25 of the housing 22 has an external opening 52. The first end 36 of the indicator member 32 passes through the external opening 52 when the fusible conductor 30 of that pole is electrically disconnected from the first or the second terminals 26,28 of that pole.

FIG. 4 shows an electrical switching apparatus 60 including a conventional three-pole circuit interrupter, such as circuit breaker 62, and the circuit breaker limiter 20 of FIG. 2. As is conventional, the circuit breaker 62 includes a housing 64, a first terminal (T) 66 (e.g., line), a second terminal 68 (e.g., load), separable contacts 70 electrically connected between the first and second terminals 66,68, and an operating mechanism 72 structured to open and close the separable contacts 70. The first terminal 26 (e.g., line) of the limiter 20 is electrically connected to the second terminal 68 of the circuit breaker 62.

Referring to FIGS. 5-7, the indicator button 32 of FIG. 2 is shown. The indicator button 32 includes a body 74 (FIG. 5) including the solid insulating first end 36, a solid insulating generally cylindrical body portion 76 (FIGS. 5 and 6) and the second end 38 having the first opening 40, the second opening 42 (FIG. 7) and the conduit 44 (FIGS. 5 and 6) therein between the first and second openings 40,42, which are disposed proximate the substantially solid second end 38 and which pass through the body 74, which is generally cylindrical. The first end 36 is electrically insulated from and physically separated from the second end 38 by the body portion 76. As best shown in FIG. 8, the first opening 40, the second opening 42 and the conduit 44 receive the fusible electrical conductor 30, which passes through the first opening 40, through the conduit 44 and through the second opening 42. The first end 36 of the button 32 is electrically insulated from and physically separated from the button second end 38 by the insulating generally cylindrical body portion 76.

The insulating generally cylindrical body portion 76 includes a shoulder 78 disposed between the first end 36 and the second end 38. A first edge 80 of the shoulder 78 is biased by the spring 34. When the fusible conductor 30 is electrically disconnected from one or both of the limiter terminals 26,28 (FIG. 2), the spring 34 moves the first end 36 of the indicator member 32 through the external opening 52 of the housing surface 25 until the second edge 82 of the shoulder 78 engages the inner portion 84 of the surface 25.

As shown with reference to FIGS. 5, 7 and 8, the second end 38 of the indicator button 32 includes a generally flat surface 86 (FIG. 7). The first and second openings 40,42 are generally defined by first and second U-shaped openings 88,90, respectively, in the generally flat surface 38 and by third and fourth opposing U-shaped openings 92,94, respectively, in the generally cylindrical body portion 76. The housing surface 24 (FIG. 8) has an opening 96 therein. The fusible conductor 30 passes from the first limiter terminal 26 (FIG. 2), through the surface opening 96, through the first U-shaped opening 88, through the third U-shaped opening 92, through the conduit 44, through the fourth U-shaped opening 94, through the second U-shaped opening 90, back through the surface opening 96, and to the second limiter terminal 28. Preferably, two suitable flexible gaskets 98, each of which includes an opening 100 corresponding to the surface opening 96, are disposed on either side of the housing surface 24.

As shown in FIG. 8, the indicator button 32 has a retaining member 102, which is an integral feature of the single-piece, unitary molded trip indicator button 32. Hence, this button 32 eliminates a separate molded part and additional assembly steps. Preferably, the external opening 52 forms a suitable conduit or other suitable feature to prevent the indicator button 32 from moving side to side after it is released by the fusible conductor 30.

Figure 1:
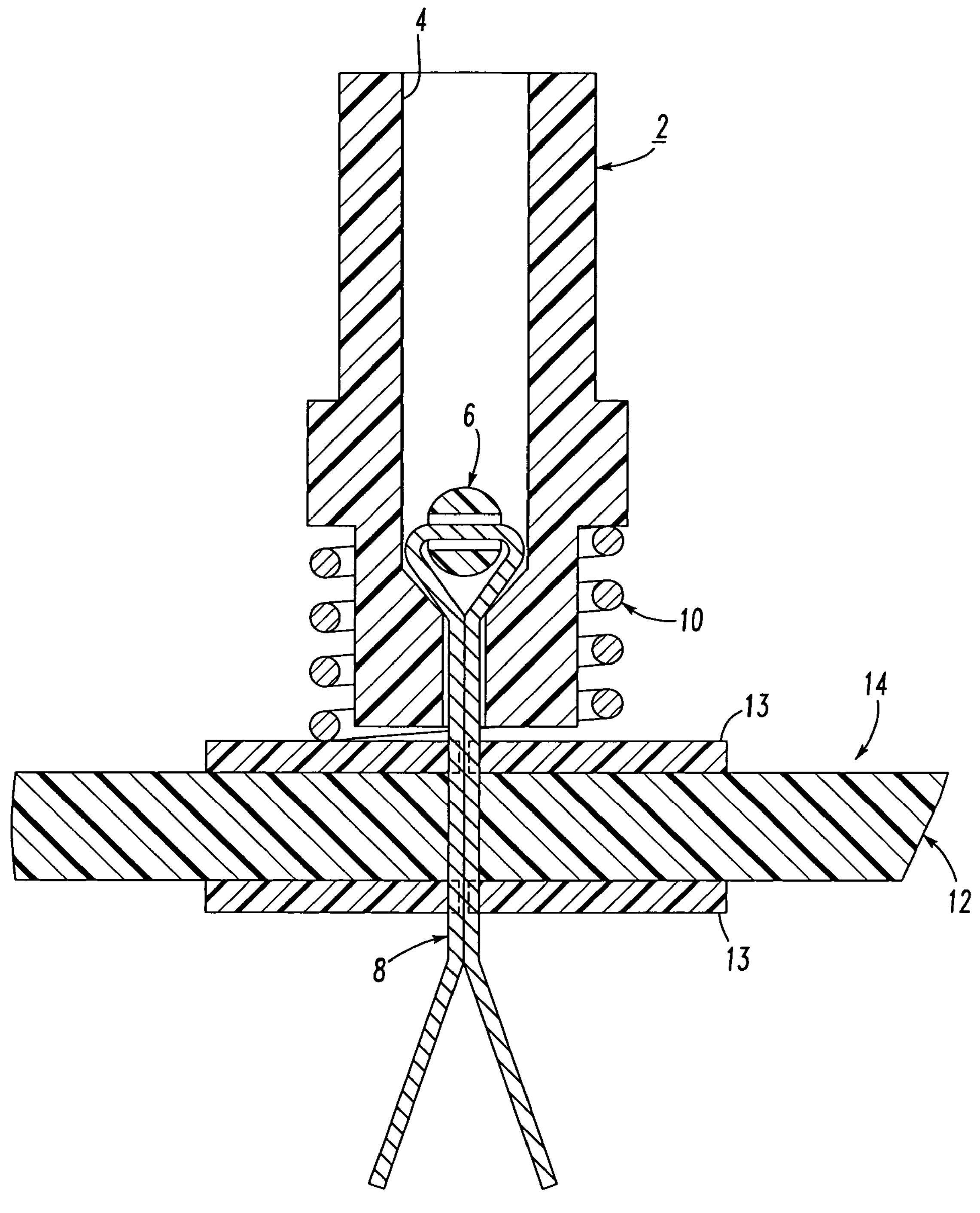
FIG. 1 PRIOR ART
FIG. 1 is a vertical elevation section view of a circuit breaker limiter including an indicator button.

The present invention cost reduces the assembly associated with the indicator button 32 with respect to known prior buttons, such as 2 (FIG. 1).

Furthermore, the upper (with respect to FIG. 8) end 36 and the body portion 76 of the molded indicator button 32 are solid, thereby prohibiting user access to the fusible wire element 30 and the rated voltage therein. Therefore, this provides a dielectric improvement.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A limiter comprising:

a housing including a first surface and a second surface;

a first terminal;

a second terminal;

a fusible conductor electrically connected between said first terminal and said second terminal;

an indicator member disposed proximate the first surface of said housing, said indicator member including a first end and a second end having a first opening, a second opening and a conduit therein between the first opening and the second opening thereof, said fusible conductor passing from said first terminal, through the first opening of said indicator member, through the conduit of said indicator member, through the second opening of said indicator member, and to said second terminal;

a spring biasing said indicator member away from the first surface of said housing;

wherein said fusible conductor, when electrically connected between said first terminal and said second terminal, holds the second end of said indicator member proximate the first surface of said housing;

wherein said spring, when said fusible conductor is electrically disconnected from at least one of said first terminal and said second terminal, moves said indicator member away from the first surface of said housing and toward the second surface of said housing 4 wherein said indicator member includes a shoulder disposed between the first end and the second end, said shoulder including an edge, said spring biasing said edge; and wherein the edge of said shoulder is a first edge; wherein said shoulder includes a second edge; wherein the second surface of said housing includes an external opening; and wherein said spring, when said fusible conductor is electrically disconnected from at least one of said first terminal and said second terminal, moves the first end of said indicator member through the external opening of the second surface of said housing until the second edge of said shoulder engages the second surface of said housing.

2. The limiter of claim 1 wherein said indicator member further includes a body having the first end, a solid insulating body portion and the second end, said second end being a substantially solid end having the first opening, the second opening and the conduit therein between the first opening and the second opening; and wherein said first end is electrically insulated from and physically separated from said substantially solid end by said solid insulating body portion, thereby prohibiting user access to said fusible conductor.

3. An electrical switching apparatus comprising:

a circuit interrupter comprising:

a housing;

a first terminal;

a second terminal;

separable contacts electrically connected between said first terminal and said second terminal;

an operating mechanism structured to open and close said separable contacts;

a limiter comprising:

a housing including a surface;

a third terminal electrically connected to the second terminal of said circuit interrupter;

a fourth terminal;

a fusible conductor electrically connected between said third terminal and said fourth terminal;

an indicator member disposed proximate the surface of the housing of said limiter, said indicator member including a first end and a second end having a first opening, a second opening and a conduit therein between the first opening and the second opening thereof, said fusible conductor passing from said third terminal, through the first opening of said indicator member, through the conduit of said indicator member, through the second opening of said indicator member, and to said fourth terminal;

a spring biasing said indicator member away from the surface of said housing;

wherein said fusible conductor, when electrically connected between said third terminal and said fourth terminal, holds the second end of said indicator member proximate the surface of said housing;

wherein said spring, when said fusible conductor is electrically disconnected from at least one of said third terminal and said fourth terminal, moves said indicator member away from the surface of said housing; and wherein said indicator member includes a shoulder disposed between the first end and the second end, said shoulder including a first edge and a second edge, said spring biasing said first edge; wherein the second surface of said housing of said limiter includes an external opening; and wherein said spring, when said fusible conductor is electrically disconnected from at least one of said third terminal and said fourth terminal, moves the first end of said indicator member through the external opening of the second surface of said housing of said limiter until the second edge of said shoulder engages the second surface of said housing of said limiter.

4. An electrical switching apparatus comprising:

a circuit interrupter comprising:

a housing;

a first terminal;

a second terminal;

separable contacts electrically connected between said first terminal and said second terminal;

an operating mechanism structured to open and close said separable contacts;

a limiter comprising:

a housing including a surface;

a third terminal electrically connected to the second terminal of said circuit interrupter;

a fourth terminal;

a fusible conductor electrically connected between said third terminal and said fourth terminal;

an indicator member disposed proximate the surface of the housing of said limiter, said indicator member including a first end and a second end having a first opening, a second opening and a conduit therein between the first opening and the second opening thereof, said fusible conductor passing from said third terminal, through the first opening of said indicator member, through the conduit of said indicator member, through the second opening of said indicator member, and to said fourth terminal;

a spring biasing said indicator member away from the surface of said housing;

wherein said fusible conductor, when electrically connected between said third terminal and said fourth terminal, holds the second end of said indicator member proximate the surface of said housing;

wherein said spring, when said fusible conductor is electrically disconnected from at least one of said third terminal and said fourth terminal, moves said indicator member away from the surface of said housing;

wherein said indicator member includes a generally cylindrical body; and wherein the first and second openings are disposed proximate the second end of said indicator member and pass through said generally cylindrical body; and wherein the second end includes a generally flat surface; wherein the first and second openings are generally defined by first and second U-shaped openings, respectively, in the generally flat surface and by third and fourth opposing U-shaped openings, respectively, in the generally cylindrical body.

5. The electrical switching apparatus of claim 4 wherein the surface of said housing of said limiter has an opening therein; and wherein said fusible conductor passes from said third terminal, through the opening of the surface of said housing of said limiter, through the first U-shaped opening, through the third U-shaped opening, through the conduit, through the fourth U-shaped opening, through the second U-shaped opening, through the opening of the surface of said housing of said limiter, and to said fourth terminal.

* * * * *